US008731233B2

(12) United States Patent
Anisimovich et al.

(10) Patent No.: US 8,731,233 B2
(45) Date of Patent: May 20, 2014

(54) SYSTEM OF AUTOMATED DOCUMENT PROCESSING

(75) Inventors: Konstantin Anisimovich, Moscow (RU); Konstantin Zuev, Moscow (RU); Andrey Lubenets, Moscow (RU)

(73) Assignee: ABBYY Development LLC, Moscow (RU)

( * ) Notice: Subject to any disclaimer, the term of this patent is extended or adjusted under 35 U.S.C. 154(b) by 1080 days.

(21) Appl. No.: 10/348,225

(22) Filed: Jan. 22, 2003

(65) Prior Publication Data
US 2004/0117738 A1    Jun. 17, 2004

(30) Foreign Application Priority Data

Dec. 17, 2002  (RU) .................................. 2002133899

(51) Int. Cl.
*G06K 9/00*     (2006.01)
(52) U.S. Cl.
USPC ............ 382/100; 382/101; 382/139; 382/181
(58) Field of Classification Search
CPC ....................................................... G06F 17/22
USPC .................. 382/181, 101, 139, 100
See application file for complete search history.

(56) References Cited

U.S. PATENT DOCUMENTS

| 5,742,685 A * | 4/1998 | Berson et al. .................. 713/186 |
| 5,841,886 A * | 11/1998 | Rhoads .......................... 382/115 |
| 5,862,243 A * | 1/1999 | Baker et al. .................... 382/101 |
| 6,110,044 A * | 8/2000 | Stern .............................. 463/29 |
| 6,356,923 B1 * | 3/2002 | Yano et al. ..................... 717/127 |
| 6,650,776 B2 * | 11/2003 | Ihara et al. ..................... 382/181 |
| 7,346,184 B1 * | 3/2008 | Carr et al. ...................... 382/100 |
| 2002/0037097 A1 * | 3/2002 | Hoyos et al. .................. 382/137 |
| 2002/0172399 A1 * | 11/2002 | Poulin et al. .................. 382/101 |
| 2004/0029639 A1 * | 2/2004 | Regan ............................. 463/42 |
| 2004/0094632 A1 * | 5/2004 | Alleshouse .................... 235/494 |
| 2004/0249764 A1 * | 12/2004 | Delitz et al. ................... 705/60 |
| 2005/0055627 A1 * | 3/2005 | Lloyd et al. ................... 715/505 |
| 2006/0138227 A1 * | 6/2006 | Alleshouse .................... 235/432 |
| 2006/0249566 A1 * | 11/2006 | Alleshouse .................... 235/375 |
| 2007/0170248 A1 * | 7/2007 | Brundage et al. ............. 235/380 |
| 2008/0030771 A1 * | 2/2008 | Alleshouse .................... 358/1.15 |
| 2008/0149713 A1 * | 6/2008 | Brundage ...................... 235/435 |
| 2009/0321513 A1 * | 12/2009 | Alleshouse .................... 235/375 |
| 2011/0303752 A1 * | 12/2011 | Alleshouse .................... 235/492 |
| 2011/0303753 A1 * | 12/2011 | Alleshouse .................... 235/492 |

* cited by examiner

*Primary Examiner* — Aaron W Carter
(74) *Attorney, Agent, or Firm* — LeighAnn Weiland; Aditya Krishnan

(57) ABSTRACT

A system is proposed for automated document processing, comprising a document, consisting of two sections—a main section, containing data in printed character form, and a supplementary section in a machine-readable form; a document forming means; a document inputting means; a character recognition means; a main and supplementary data comparison means. Said system uses the supplementary section data to confirm the main section data. The supplementary section data can fully or partly duplicate the main section data, supplement it and also comprise other additional data. The supplementary machine-readable section can be realized in a form of coded consecutive characters, printed graphic image (bar-code), magnetic, optical, microprocessor or other kind of data storage means. For enhancing security of documents all or a part of data can be coded prior to introduction into the supplementary section.

29 Claims, 8 Drawing Sheets

Wire/Funds Transfer Payment Order  FIG. 1b

BANK  Phone:

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

ORIGINATING LOAN PROCESS DATA

Charge/Paid (if necessary)
Date (MM.DD.YY):

Entered By: _____
Verified By: _____

FTN     Internal Use

INTERMEDIARY BANK DATA
ABA/Routing Number: _____
SWIFT CODE: UNCRIT2B912
Acct name or Bank: The Bank of New York    New York
Branch Information: PASCO YORK0BIDONIC corr acc 1040-998-973

BENEFICIARY BANK DATA
ABA / Routing Number: _____
SWIFT CODE: _____
Account name or Bank: _____
Branch Information: _____

BENEFICIARY DATA
Beneficiary Name: VASILY BORISOV found in ULYINSKY branch
Address: 7 Lanbrua muche Rua  February 101000 Russian Federation
Account Number: RUINSKY la musician acount #513008901974199992001
Routing #: account#123012305516071002464  Floua. WANOVA

PROCESSING ENTRIES
Send From Acct: _____  $YYYYYY
Fee Amt: _____  $15.00
Amt CL: _____  $YYYYYY
Address of Bank: _____  X 02345
Bank Code: _____
Entries Made By: _____

ORIGINATOR DATA
Member Name: Faruk Gutuubu
Address: 1216 E Miradoura Arm AHKARA
Phone Number: +1 (096) 111-22-33
Account: 1117100226
Dollar Amt: $110.00
X (signature) _____    #1 (111111)

1

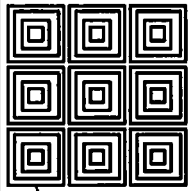

Wire/Funds Transfer Payment Order

BANK    Phone:

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

Charge/Paid (if necessary) _____    Entered By: _____    Internal Use
Date (MM.DD.YY): _____              Verified By: _____

ORIGINATING LOAN PROCESS DATA

INTERMEDIARY BANK DATA
ABA/Routing Number: _____
SWIFT CODE: UNCRIT2B912
Acct name or Bank: The Bank of New York    New York
Branch Information: PASCO YORK08IDONIC corr acc 1040-998-973

BENEFICIARY BANK DATA
ABA / Routing Number: _____
SWIFT CODE: _____
Account name or Bank: _____
Branch Information: _____

BENEFICIARY DATA
Beneficiary Name: VASILY BORISOV found in ULYINSKY branch
Address: 7 Lanbrua muche Rua   February 101000 Russian Federation
Account Number: RUINSKY la musician acount #51300890197419992001
Routing #: account#12301230551607100246.4   Floua. WANOVA

FTN

PROCESSING ENTRIES

Send From Acct: _____
Fee Amt: $YYYYY
Amt CL: $15.00
Address of Bank: $YYYYY
Bank Code: X 02345
Entries Made By: _____

ORIGINATOR DATA
Member Name: Faruk Gutuubu
Address: 1216 E Miradoura Arm AHKARA
Phone Number: +1 (096) 111-22-33
Account: 1117100226
Dollar Amt: $110.00
X (signature) _____    #1 (111111)

AJ102938475&JHG1H576II6688RGGTPSK761625LK5368NEEWSCVXZ998DI

BANK Phone:  Wire/Funds Transfer Payment Order  FIG. 1d

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

Charge/Paid (if necessary) ☐          Entered By: _____   ☐ Internal Use
Date (MM.DD.YY):                       Verified By: _____

ORIGINATING LOAN PROCESS DATA     FTN ☐

INTERMEDIARY BANK DATA
ABA/Routing Number: _____
SWIFT CODE: UNCRIT2B912
Acct name or Bank: The Bank of New York    New York
Branch Information: PASCO YORK08IDONIC corr acc 1040-998-973

BENEFICIARY BANK DATA
ABA / Routing Number: _____
SWIFT CODE: _____
Account name or Bank: _____
Branch Information: _____

BENEFICIARY DATA
Beneficiary Name: VASILY BORISOV found in ULYINSKY branch
Address: 7 Lanbrua muche Rua  February 101000 Russian Federation
Account Number: RUINSKY la musician acount #5130089019741 99992001
Routing #: account#1230123055160710002464  Floua. WANOVA

PROCESSING ENTRIES
Send From Acct: _____ $YYYYY
Fee Amt: _____ $15.00
Amt CL: _____ $YYYYY
Address of Bank: _____ X 02345
Bank Code: _____
Entries Made By: _____

ORIGINATOR DATA
Member Name: Faruk Gutuubu
Address: 1216 E Miradoura Arm AHKARA
Phone Number: +1 (096) 111-22-33
Account: 1117100226
Dollar Amt: $110.00
X (signature) _____  #1 (111111)

1

2

FIG. 1e Wire/Funds Transfer Payment Order

BANK Phone:

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

Charge/Paid (if necessary)
Date (MM.DD.YY):

ORIGINATING LOAN PROCESS DATA

Entered By:
Verified By:

FTN

Internal Use

INTERMEDIARY BANK DATA
ABA/Routing Number:
SWIFT CODE: UNCRIT2B912
Acct name or Bank: The Bank of New York    New York
Branch Information: PASCO YORK08IDONIC corr acc 1040-998-973

BENEFICIARY BANK DATA
ABA / Routing Number:
SWIFT CODE:
Account name or Bank:
Branch Information:

BENEFICIARY DATA
Beneficiary Name: VASILY BORISOV found in ULYINSKY branch
Address: 7 Lanbrua muche Rua February 101000 Russian Federation
Account Number: RUINSKY la musician account #5130089019741999200 1
Routing #: account#12301230551607100246 4  Floua. WANOVA

PROCESSING ENTRIES
Send From Acct:
Fee Amt:           $YYYYY
Amt CL:            $15.00
Address of Bank:   $YYYYY
Bank Code:         X 02345
Entries Made By:

ORIGINATOR DATA
Member Name: Faruk Gutuubu
Address: 1216 E Miradoura Arm AHKARA
Phone Number: +1 (096) 111-22-33
Account: 1117100226
Dollar Amt: $110.00
X (signature)  #1 (111111)

1
2

BANK Phone: _____  Wire/Funds Transfer Payment Order  FIG. 1f

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

ORIGINATING LOAN PROCESS DATA

Charge/Paid (if necessary) _____   Entered By: _____   Internal Use
Date (MM.DD.YY): _____            Verified By: _____

FTN

INTERMEDIARY BANK DATA | PROCESSING ENTRIES

ABA/Routing Number: _____
SWIFT CODE: UNCRIT2B912
Acct name or Bank: The Bank of New York    New York
Branch Information: PASCO YORK08IDONIC corr acc 1040-998-973

Send From Acct: _____ $YYYYYY
Fee Amt: $15.00
Amt CL: $YYYYYY
Address of Bank: _____
Bank Code: X 02345
Entries Made By: _____

BENEFICIARY BANK DATA

ABA / Routing Number: _____
SWIFT CODE: _____
Account name or Bank: _____
Branch Information: _____

BENEFICIARY DATA | ORIGINATOR DATA

Beneficiary Name: VASILY BORISOV found in ULYINSKY branch
Address: 7 Lanbrua muche Rua February 101000 Russian Federation
Account Number: RUINSKY la musician acount #51300890197419992001
Routing #: account#123012305516071002464 Floua. WANOVA Member Name: Faruk Gutuubu
Address: 1216 E Miradoura Arm AHKARA
Phone Number: +1 (096) 111-22-33
Account: 1117100226
Dollar Amt: $110.00
X (signature) _____        #1 (111111)

1

2

BANK        Wire/Funds Transfer Payment Order        FIG. 1g

Phone:

The undersigned originator requests payment to be made to the beneficiary or account number named below. To the extent not prohibited by law, the undersigned agrees that this wire transfer is irrevocable and that the sole obligation of the institution named above is to exercise ordinary care in processing this wire transfer and that it is not responsible for any losses or delays which occur as a result of any other party's involvement in processing this transfer.

ORIGINATING LOAN PROCESS DATA

Charge/Paid (if necessary) _____     Entered By: _____     Internal Use
Date (MM.DD.YY): _____              Verified By: _____

INTERMEDIARY BANK DATA

ABA/Routing Number: _____                                         FTN
SWIFT CODE: UNCRIT2B912
Acct name or Bank: The Bank of New York    New York
Branch Information: PASCO YORK08IDONIC corr acc 1040-998-973

BENEFICIARY BANK DATA

ABA / Routing Number: _____
SWIFT CODE: _____
Account name or Bank: _____
Branch Information: _____

BENEFICIARY DATA

Beneficiary Name: VASILY BORISOV found in ULYINSKY branch
Address: 7 Lanbrua muche Rua  February 101000 Russian Federation
Account Number: RUINSKY la musician acount #51300890197419992001
Routing #: account#12301230551607100246.4  Floua. WANOVA

PROCESSING ENTRIES

Send From Acct: _____ $YYYYY
Fee Amt: _____ $15.00
Amt CL: _____ $YYYYY
Address of Bank: _____ X 02345
Bank Code: _____
Entries Made By: _____

ORIGINATOR DATA

Member Name: Faruk Gutuubu
Address: 1216 E Miradoura Arm AHKARA
Phone Number: +1 (096) 111-22-33
Account: 1117100226
Dollar Amt: $110.00
X (signature) _____ #1 (111111)

{ 1 }

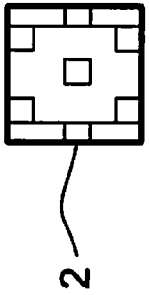

2

SYSTEM OF AUTOMATED DOCUMENT PROCESSING

BACKGROUND OF THE INVENTION

1. Field of the Invention

The present invention relates generally to a document formation, input, control and processing automation and more particularly to the recognition of printed and handwritten characters from a bit-mapped image file.

2. Prior Art

According to traditional methods, document processing comprises either document formation in printed form on a paper media, and further input thereof, commonly manually or by scanning and recognition at the point of accepting, processing, registering and storing. But for all that, both methods do not guarantee the absence of errors. During manual input most of errors are due to the peculiarities of a human as an operator. An automated input via scanning and recognition causes errors due to the probabilistic base of recognition methods.

Automated document input and recognition is used in a bank automated system and specifically in payment document input, according to which the point of accepting documents is equipped with an optical scanner, connected to a computer, where the recognition process is performed. The system performs the payment document scanning and further text recognition, i.e. uses the probabilistic methods that can cause errors. In the said system the verification is performed by an operator causing the decrease of system productivity in comparison with fully automated control.

Known systems uses various kinds of supplementary machine readable data storage means to achieve various technical results.

Traditionally a bar-code is used in connection with documents or goods for assigning to them a unique machine-readable identification number for automated registration or recordation purposes. The following US patents can be an example of this—U.S. Pat. No. 5,640,647 issued Jun. 17, 1997, U.S. Pat. No. 6,276,535 issued Aug. 21, 2001, U.S. Pat. No. 6,085,975 issued Jul. 11, 2000, U.S. Pat. No. 5,844,221 issued Dec. 1, 1998, U.S. Pat. No. 5,804,806 issued Sep. 8, 1998, U.S. Pat. No. 5,682,819 issued Nov. 4, 1997, and U.S. Pat. No. 5,493,107 issued Feb. 20, 1996.

The main inadequacy of traditional systems is a limitation of bar-code use mainly for identification number storage. For example, system of mail items registration and service, according to U.S. Pat. No. 6,101,487 issued Aug. 8, 2000, proposes postal requisites coding and inserting into a bar-code, marked on a mail item for automation of passing it through process to the addressee. As mentioned previously, the inadequacy of such a system is through the different sources from which a human operator and a computer get the address data, and the impossibility of an operator to visually control the barcode data.

One more known system involves enhancing security of gaming tickets (tickets in game business) by embodying a machine-readable indicium (preferably bar-code) into payout ticket from a gaming machine, is proposed in U.S. Pat. No. 6,110,044 issued Aug. 29, 2000. This system does not suppose mass ticket processing with automated data comparison between text and bar-code sections of each ticket. The data verification is performed visually for each winning ticket and is not a quick process. The main disadvantage of the method is its unfitness for automated verification of text data with that of bar-code.

Another known method deals with a bar-code used for document registration purposes in an automated specialized database (U.S. Pat. No. 6,356,923 issued Mar. 12, 2002). According to it a registration card is marked by a bar-code containing accounting data and a table of contents of the document in coded form. Said table of contents has no room on the card in text form. The system either does not support automated verification or confirmation of the text data via bar-code data.

In the automated system of payment document formation and control, proposed in patent RU #2190252 Sep. 27, 2002, a bar-code, either one- or two-dimensional, is used for providing automatic document input. All significant data of a payment document of standard form is written to a bar-code printed on the spare space of the document. The system is provided with a special device for bar-code data input. Payment document data read from bar-code is directed to the further bank processing and storage. A mutual data confirmation between bar-code and text is not provided.

The system does not sufficiently prevent falsification, since the text portion of a document and its bar-code portion can contain different transaction details that cannot be verified visually. The differences may concern payment sum, beneficiary details etc. The falsification safeness is especially important for payment documents, that are the main subject of the said patent.

To increase the falsification safeness of text or/and bar-code data the said system needs to include supplemental visual verification of text data in conformity with bar-code data, and that will require involving a human operator for processing and thus considerably decrease system productivity.

So, all known methods are highly limited in ability to automate data input and confirmation and thus they cannot be used for achieving the declared technical result.

SUMMARY OF THE INVENTION

The technical result of the proposed invention is an acceleration of document processing, reducing data input errors, confirmation of document data authenticity.

The said technical result is achieved by dividing the document into two sections—the main section, containing data in a text form, and the supplementary section, containing data copy of all or a significant portion of document information, any additional data, adapted for automated input by special computer compatible devices. Such additional data is not convenient or even possible for human visual perception. The addition of a said machine-readable data section eliminates input errors, provides data protection function, prevents from manual data modification. In the present invention the supplementary data is used either for automated verification of recognition results of the main section text or data contents confirmation.

The system of the present invention comprises:

a) a document, comprising at least of two sections—a main section, containing document data in a text form, suitable for human visual perception, and a supplementary section, containing data in a machine-readable form;

b) document forming means, providing printing of the text portion of document, and data transformation to machine-readable form and writing it onto the supplementary section thereof;

c) document data input means, suitable for either a character (commonly optical scanning device), or a machine-readable data input (Readers for machine-readable data may differ, depending on machine-readable media type);

d) character recognition means, commonly specialized software for text recognition from bit-mapped image file, obtained from optical scanner or the like; in the preferred embodiment as a specialized software is successfully used such as "ABBYY FineReader" or "ABBYY FormReader" of the latest versions, depending on the document type ("ABBYY FineReader"Ver.6.0. Users Guide. Moscow: 2002. "ABBYY FormReader"Ver.4.1. Users Guide. Moscow: 2001); and e) means for the main and supplementary data comparison.

A comparison of all or a part of document data is provided. The size of compared portions of data is set beforehand. Depending upon the document type information of either the main section or the supplementary one may be considered as correct data.

BRIEF DESCRIPTION OF THE DRAWING DRAWINGS

FIG. 1b shows a document provided by a two-dimension bar-code.

FIG. 1c shows a document provided by data coded by consecutive characters.

FIG. 1d shows a document provided by magnetic data media.

FIG. 1e shows a document provided by optical data media.

FIG. 1f shows a document provided by magneto-optical data media.

FIG. 1g shows a document provided by electro-mechanical data media.

FIGS. 1a, 1b, 1c, 1d, 1e, 1f, 1g, show the main (1) and the supplementary (2) sections of a document.

DETAILED DESCRIPTION OF THE INVENTION

The main distinction of the system, proposed by the present invention is that it uses data from a document main section and a supplementary section for the mutual comparison and confirmation of data accuracy.

The document formation means are not connected physically with the rest of the system.

The supplementary section may contain at least a copy of the whole or a part of the document data. The supplementary section data can also supplement the main section data, or contain other additional information.

The supplementary section of the document may be realized either as printed on the document or embodied into it (or attached to it).

The supplementary section of the document may be placed on an empty space either on the face or opposite side thereof.

Various kinds of stroke or graphic images can be printed on the document, and particularly the standard and/or non-standard barcodes, points and/or spot assemblies, character successions, and their combinations.

The embodied or attached means can be realized as machine-readable media of various kinds. It can be realized on magnetic, optical, micro-electronic, micro-processor or other bases, if its dimensions provide to imbed it into an empty band of the document, and data access may be applied to such document in the technological process of data processing.

The decision-making rule may vary depending on different document types. The data of either the main or the supplementary section may be assumed as a correct one. Some kind of conclusion can be made even in the case of non-coincidence of both sections, giving no preference to anyone of them.

In the case of a data discrepancy between the main and supplementary sections, the final decision about the data correctness and content may be made with the help of a human operator or by special automated means.

For enhancing security of a document, all or a part of data can be additionally coded prior to introduction into a supplementary section.

Some kinds of documents are adapted to work (fit, function) in the system, proposed by the present invention are shown in FIGS. 1a, 1b, 1c, 1d, 1e, 1f, and 1g.

Figure 1A:
FIG. 1a shows a document provided by a one-dimension bar-code.

FIG. 1a shows a document provided by one-dimension bar-code.

FIG. 1b shows a document provided by two-dimension bar-code.

FIG. 1c shows a document provided by data coded by a character consecution.

FIG. 1d shows a document provided by magnetic data media.

FIG. 1e shows a document provided by optical data media.

FIG. 1f shows a document provided by magneto-optical data media.

FIG. 1g shows a document provided by electro-mechanical data media.

Figure 2:
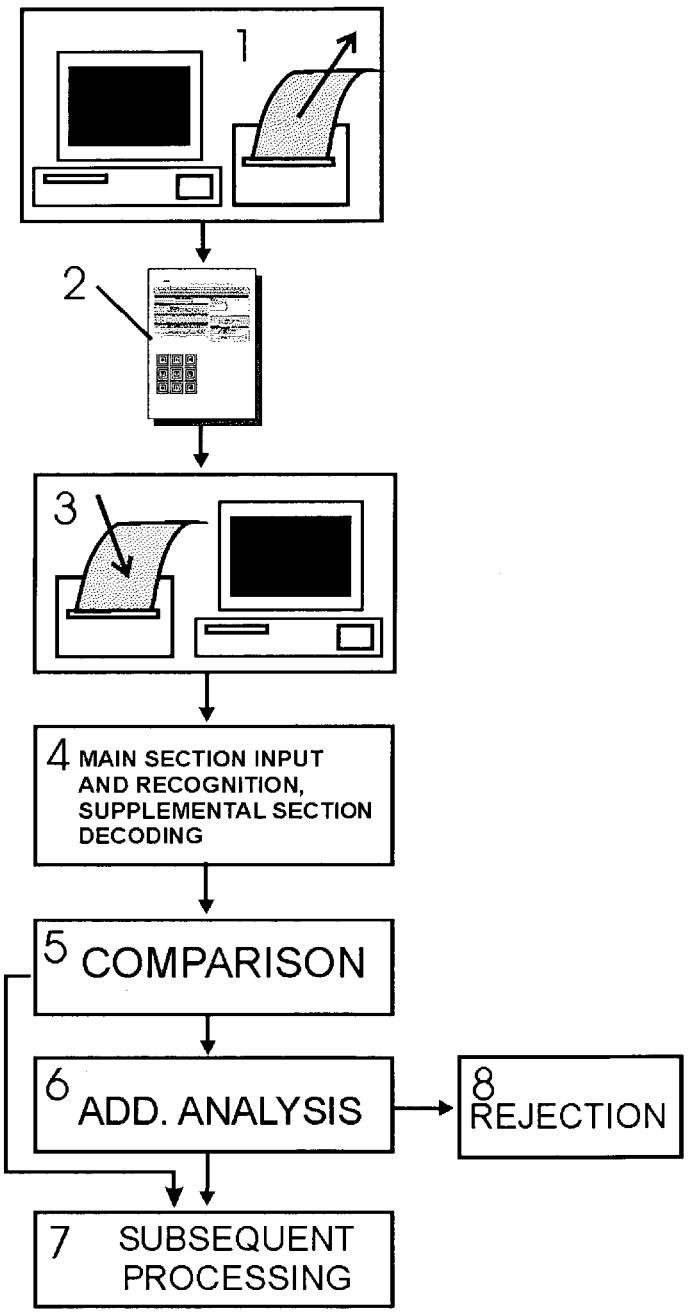
FIG. 2 shows the flow diagram of the system.

FIG. 2 shows the flow diagram of the system.

A general overview of the invention is illustrated in FIG. 2.

By means of a document forming device (1) a new document (2) is created, and it contains two sections—the main section with all data of the document printed on it in usual printed character form, suitable for human visual perception, and the supplementary section with data in machine-readable form. To use a special data media, differing from a printed image in the supplementary section, a special input device is necessary.

A document forming device may not be required to be connected physically with the rest the system.

Document is directed to the system input device (3), fit for optical scanning of the character data of the main section and supplementary section data. If a special data media, used in the supplementary section, differs from a printed image, a special input device is necessary.

The main section data is then directed for character recognition and marking out the significant portion thereof (4).

Whole or a predefined portion of the main section data is then compared with whole or a predefined portion of the supplementary section data in the block of comparison (5).

If data from both sections coincide with each other, the document is assumed as correct and is directed to further processing or storage (7).

If data from both sections does not coincide with each other, all data is directed to additional processing (6). The said additional processing may be performed by human operator intervention or in a fully automatic manner. In the case of data confirmation on this stage, the document, assumed as correct, is directed to further processing or storage (7). Otherwise, the document is marked erroneous and therefore rejected (8).

The invention claimed is:

1. A system of automated document processing, the system comprising:
    a document, containing at least a main section and a supplementary section, said main section containing data in character form, said supplementary section containing data in machine-readable form, wherein the supplementary section data is written onto a special data storage media, and wherein said special data storage media is attached to said supplementary section of the document;

a document forming device, including a device for printing the main section data, and a special device for data transformation and outputting to the supplementary section of the document;

at least one device for inputting data from the main and supplementary sections;

a character recognition device, capable of recognizing the data in character form; and a comparison device capable of comparing a whole or predefined portion of the recognized character data from the main section of the document with a whole or a predefined portion of the data from the supplementary section;

wherein said comparing depends on a type of said document.

2. The system as recited in claim 1, wherein the supplementary section data comprises a copy of the whole or a significant part of the main section document data.

3. The system as recited in claim 1, wherein the supplementary section comprises a complementary portion of document data that is absent in the main section.

4. The system as recited in claim 1, wherein the supplementary section comprises other supplementary data.

5. The system as recited in claim 1, wherein a decision about a type of subsequent document processing is made in accordance with the result of a comparison of the main and the supplementary sections data by the comparison device.

6. The system as recited in claim 1, wherein a decision about the accuracy of the main section data is made in accordance with the result of the comparison of the main and the supplementary sections data.

7. The system as recited in claim 6, wherein the decision on the data accuracy is made automatically.

8. The system as recited in claim 1, wherein the main section data is considered as more accurate than the supplementary section data.

9. The system as recited in claim 1, wherein the supplementary section data is considered as more accurate than the main section data.

10. The system as recited in claim 1, wherein the decision on the data accuracy is made only in the case of a full coincidence of predetermined portions of main and supplementary sections.

11. The system as recited in claim 1, wherein the supplementary section data is placed onto the document via printing.

12. The system as recited in claim 1, wherein the special data storage media is a magnetic type storage media.

13. The system as recited in claim 1, wherein the special data storage media is an optical type storage media.

14. The system as recited in claim 1, wherein the special data storage media is a microprocessor type storage media.

15. The system as recited in claim 1, wherein the supplementary section data is placed on the document in the form of aggregate of points or strokes.

16. The system as recited in claim 1, wherein the supplementary section data is placed on the document in bar-code form.

17. The system as recited in claim 1, wherein the supplementary section data is placed on the document in the form of a one-dimensional bar-code.

18. The system as recited in claim 1, wherein the supplementary section data is placed on the document in the form of a two-dimensional bar-code.

19. The system as recited in claim 1, wherein the supplementary section data is placed on the document in special ink.

20. The system as recited in claim 1, wherein the supplementary section data is placed on the document as coded in the form of a character string.

21. The system as recited in claim 20, wherein the supplementary section data is placed on the document as coded in the form of a numerical string.

22. The system as recited in claim 1, wherein the supplementary section data is subjected to extra coding prior to outputting onto the document.

23. A method of automated document processing comprising:

printing a main section of a document, wherein the main section includes data in character form;

printing a supplementary section of the document, wherein the supplementary section includes data in machine-readable form, wherein the machine-readable form includes an aggregate of at least one of points and strokes, wherein the supplementary section data is written onto a special data storage media, and wherein said special data storage media is attached to said supplementary section of the document;

performing optical character recognition (OCR) on the main section of the document;

comparing the OCR'd data in the main section of the document to the machine-readable data in the supplementary section of the document, wherein said comparing depends on a type of said document;

in response to comparing the OCR'd data in the main section to the machine-readable data in the supplementary section, determining that the OCR'd data in the main section is accurate; and in response to determining that the OCR'd data in the main section is accurate, storing the document.

24. A method according to claim 23 wherein determining that the OCR'd data in the main section is accurate is performed automatically.

25. An apparatus for automated document processing comprising:

a text printer that is configured to print a main section of a document in character form;

a data transformer that is configured to transform into machine-readable form at least one of data points and data strokes and to print the transformed machine-readable data in a supplementary section of the document, wherein the supplementary section data is written onto a special data storage media, and wherein said special data storage media is attached to said supplementary section of the document;

a data receiver that is configured to receive the main section of the document and the supplementary section of the document;

an optical character recognizer that is configured to recognize characters in the main section of the document;

a comparator that is configured to compare the OCR'd data in the main section of the document to the machine-readable data in the supplementary section of the document, wherein said comparison depends on a type of said document;

a decision maker that, in response to comparing the OCR'd data in the main section to the machine-readable data in the supplementary section, is configured to decide that the OCR'd data in the main section is accurate; and a storage that is configured to store the document in response to the decision that the OCR'd data in the main section is accurate.

26. An apparatus according to claim 25 wherein the decision maker is further configured to decide manually that the OCR'd data in the main section is accurate.

27. An apparatus according to claim 25, wherein the decision maker is further configured to decide in an automated manner that the OCR'd data in the main section is accurate.

28. The system of claim 1, wherein said document type determines whether the main section or the supplementary section is considered as correct when there is a discrepancy between the two sections.

29. The method of claim 23, wherein said document type determines whether the main section or the supplementary section is considered as correct when there is a discrepancy between the two sections.

* * * * *